United States Patent [19]
Kato et al.

[11] 3,855,274
[45] Dec. 17, 1974

[54] PROCESS FOR PREPARING DIALKYL (ETHYLENEDIOXY) BIS-BENZOATE

[75] Inventors: Toshio Kato, Omiya; Chisei Shibuya, Tokyo, both of Japan

[73] Assignee: Asahi Kasei Kogyo Kabushiki Kaisha, Osaka, Japan

[22] Filed: Sept. 14, 1971

[21] Appl. No.: 180,452

[52] U.S. Cl. .............................................. 260/473 R
[51] Int. Cl. .............................................. C07c 69/78
[58] Field of Search ................................. 260/473 R

[56] References Cited
OTHER PUBLICATIONS
Senoo et al. CA 72 55030b (1970).

Primary Examiner—Lorraine A. Weinberger
Assistant Examiner—John F. Terapane
Attorney, Agent, or Firm—Cushman, Darby & Cushman

[57] ABSTRACT

In the preparation of a dialkyl (ethylenedioxy)bis-benzoate by the reaction of an alkali salt of alkyl hydroxybenzoate with ethylene dichloride in an aliphatic alcohol solvent, the objective compound is obtained in good yield with suppressing the by-production of vinyl chloride by effecting the reaction in a relatively high concentration of the alkali salt of alkyl hydroxybenzoate in the solvent and/or in the presence of the alkyl hydroxybenzoate.

8 Claims, No Drawings

PROCESS FOR PREPARING DIALKYL (ETHYLENEDIOXY) BIS-BENZOATE

This invention relates to a process for preparing dialkyl (ethylenedioxy)bis-benzoate by reacting an alkali salt of alkyl hydroxybenzoate with ethylene dichloride in the presence of an aliphatic alcohol as a solvent.

More particularly, the present invention relates to an improved process for preparing dialkyl (ethylene-dioxy)bis-benzoate by carrying out said reaction in a high concentration as 18 % by weight or more of the alkali salt of alkyl hydroxybenzoate in the aliphatic alcohol, and/or in the presence of 5 % by mole or more of alkyl hydroxybenzoate based on the amount of alkali salt of hydroxybenzoate.

Dialkyl (ethylenedioxy)bis-benzoates are important starting materials for producing polyesters or polyamides which are useful for preparing synthetic fibers and plastics.

There has been known to prepare dialkyl (ethylenedioxy)bis-benzoate by reacting an alkali salt of alkyl hydroxybenzoate with ethylene dibromide in ethanol under reflux. The above-mentioned process, however, has many defects such as the starting materials costing high, the yield of the product being extremely low, and unsuitable for commercial scale production.

According to the present invention, ethylene dichloride is employed instead of ethylene dibromide. The reaction proceeds as follows:

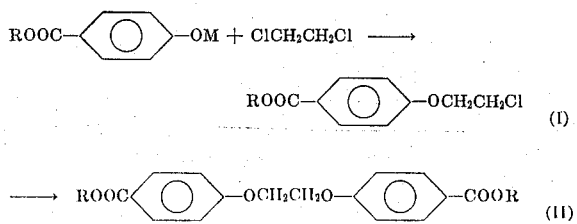

wherein M is an alkali metal and R is an lower aliphatic alkyl group.

In the above reaction, however, by-production of vinyl chloride is inevitable. In most cases, reaction rate of towards the vinyl chloride is several times faster than that towards the compound of (I) and (II), and the yield of dialkyl (ethylenedioxy)bis-benzoate is very low. The present inventors have found that the yield of the aimed product increases extremely when critical conditions are employed.

An object of the present invention is to provide a process for preparing dialkyl -ethylenedioxy)bis-benzoates in good yield. Another object of the present invention is to provide a process for preparing dialkyl (ethylenedioxy)bis-benzoates with controlling the by-production of vinyl chloride.

The objects of the present invention can be attained by effecting the reaction in a concentration of 18 % by weight or more, preferably 20 to 80 % by weight, of an alkali salt of alkyl hydroxybenzoate in the aliphatic alcohol and/or in the presence of 5 % by mole or more of an alkyl hydroxybenzoate based on the amount of the alkali salt of alkyl hydroxybenzoate at an elevated temperature.

The aliphatic alcohols which are employed as a solvent in accordance with the present invention include methanol, ethanol, propanol, isopropanol, butanol, amylalcohol, isoamylalcohol, hexanol, cyclohexanol and the like, as well as a mixture thereof. Absolute alcohol is employed preferably but the alcohol containing about 0.8 % by weight of water can be employed in the present process.

As the alkali salt of alkyl hydroxybenzoate, there are mentioned para and meta isomers excluding ortho isomer. The alkyl moiety thereof includes an aliphatic alkyl having 1 to 8 carbon atoms. The alkali metal used as a salt includes lithium, sodium and potassium.

The temperature used in the present process may be selected optionally an appropriate ones as far as they do not give obstacle to the reaction. However, when a temperature lower than 100°C is employed, the reaction proceeds slowly and the yield of objected compound is low, so that the reaction is not suitable for the commercial scale production of the dialkyl (ethylenedioxy)bis-benzoate. Temperatures higher than 280°C are not preferable, because decompositions of starting materials and intermediates such as alkyl chloroethoxybenzoate (MCEB) take place considerably, resulting in an unavoidable lowering of the yield. Thus, the preferable temperature lies generally in a range of 120° to 230°C. The reaction pressure is not important and may be an atmospheric pressure or an autogeneous pressure, depending on the variety of the solvent and temperature used.

The concentration of the alkali salt of alkyl hydroxybenzoate employed is 18% by weight or more, preferably 20% to b 80% by weight, based on its aliphatic alcohol solution. When the concentration is lower than 18% by weight, the by-production of vinyl chloride exceeds the production of the compounds of the formulae (I) and (II). When the alkali salt of alkyl hydroxybenzoate is employed more than 80 80% by weight, a serious problem such as uncomplete resolution of the raw materials or difficulty of the transference of the solution, which renders the commercial practice of the process difficult.

The effect of the concentration of alkali salt of alkyl hydroxybenzoate will become clear by the following Examples.

EXAMPLES 1 AND 2, COMPARATIVE EXAMPLES 1 AND 2

Into a reaction tube having a volume of 50 ml. were charged 10 ml. of absolute ethanol, sodium salt of methyl p-hydroxybenzoate (SMHB) the amount of which was shown in Table 1, and an equivalent amount of ethylene dichloride (EDC). The tube was then sealed and heated at 140°C for given periods as shown in the Table. The reaction mixture was taken out periodically, and the products determined by means of gas chromatography. The results are shown in Table 1.

The determination of the products was as follows:

Methyl chloroethoxybenzoate (MCEB) (I)

| Apparatus: | Shimazu Gas Chromatography 3AF (made by Shimazu Seisakusho Co., Ltd.) |
|---|---|
| Column temperature: | 180°C |
| Column material: | OV 17 |
| Column length: | 2 m |
| Inlet temperature: | 180°C |
| Carrier gas: | $N_2$ |

-Continued
Dimethyl 4,4'(ethylenedioxy) bis-benzoate (MEBB)

| | |
|---|---|
| Apparatus: | Shimazu Gas Chromatography 3AF (made by Shimazu Seisakusho Co., Ltd.) |
| Column temperature: | 275°C |
| Column material: | OV 17 |
| Column length: | 1 m |
| Inlet temperature: | 275°C |
| Carrier gas: | $N_2$ |

Vinyl chloride (VC)

| | |
|---|---|
| Apparatus: | Gas Chromatograph KGL-2B (made by Hitachi Ltd.) |
| Column material: | n-hexadecane |
| Column length: | 75 cm |
| Column temperature: | 55°C |
| Inlet temperature: | 80°C |
| Carrier gas: | He |

EXAMPLES 3, 4, 5 AND 6, COMPARATIVE EXAMPLE 3

Into a reaction tube having a volume of 50 ml were charged 3.0 milimole of sodium salt of methyl p-hydroxybenzoate, 1.5 milimole of ethylene dichloride, 12 g of absolute methanol and methyl p-hydroxybenzoate (MHB) The amount of which is shown in Table 2. The tube was then sealed and the reaction was carried out at 140°C. The results were shown in Table 2.

As is clear from Table 2, the addition of 5% by mole or more, preferably 10% by mole or more, of an alkyl hydroxybenzoate based on the alkali salt of alkyl hydroxybenzoate suppresses the by-production of a vinyl chloride sufficiently. This effect of the alkyl hydroxybenzoate is astonishing and cannot merely be explained by the sum of the solvent effects of aliphatic alcohol and alkyl hydroxybenzoate.

The objects of the present invention may alternatively attained by addition of alkyl hydroxybenzoate to the reaction system. The effect of adding alkyl hydroxybenzoate will be apparent by the following Examples.

Table 2

| Example No. | MHB (mole %)[3] | Products | Yield (%) Reaction time (min.) | | |
|---|---|---|---|---|---|
| | | | 30 | 60 | 90 |
| Comparative Example 3 | 0 | MCEB + MEBB | 13.2 | 19.0 | — |
| | | VC | 37.6 | 49.0 | — |
| Example 3 | 10 | MCEB + MEBB | 13.0 | 19.0 | 23.0 |
| | | VC | 27.5 | 38.9 | 45.0 |
| Example 4 | 30 | MCEB + MEBB | 15.1 | 25.5 | 31.3 |
| | | VC | 16.8 | 27.2 | 33.5 |
| Example 5 | 100 | MCEB + MEBB | 18.9 | 33.5 | 45.1 |
| | | VC | 11.0 | 18.8 | 23.8 |
| Example 6 | 500 | MCEB + MEBB | 18.2 | 31.1 | 39.4 |
| | | VC | 6.2 | 10.5 | 12.6 |

Note:
[3] Percent by mole is based on the moles of sodium salt of methyl p-hydroxybenzoate.

Table 1

| Example No. | SMHB (wt.%)[1] | Products | Yield (%)[2] Reaction time (min.) | | |
|---|---|---|---|---|---|
| | | | 20 | 40 | 90 |
| Comparative Example 1 | 1 milimole (2.2) | MCEB + MEBB | 6.9 | 10.2 | 14.8 |
| | | VC | 26.2 | 37.1 | 44.6 |
| Comparative Example 2 | 2 milimole (4.2) | MCEB + MEBB | 8.7 | 15.6 | 24.2 |
| | | VC | 25.6 | 38.1 | 45.3 |
| Example 1 | 10 milimole (18.1) | MCEB + MEBB | 27.5 | 36.5 | 43.0 |
| | | VC | 30.0 | 37.5 | 44.0 |
| Example 2 (180°C) | 40.4 milimole (50) | MCEB + MEBB | 49.2 | 49.2 | — |
| | | VC | 36.3 | 36.5 | — |

Note:
[1] Percent by weight is based on the weight of ethanol solution.
[2] VC yield is mole % based on E.D.C. fed. MCEB + MEBB yield is 2 × mole % based on alkali salt of alkyl p-hydroxy-benzoate.

Table 3

| Example No. | MHB (milimole) | Solvent | Products | Yield (%) Reaction time (min.) | |
|---|---|---|---|---|---|
| | | | | 40 | 150 |
| Comparative Example 4 | 0 | Sulfolane | MCEB + MEBB | 27.1 | — |
| | | | VC | 68.5 | — |
| Comparative Example 5 | 3.0 | | MCEB + MEBB | 28.6 | — |
| | | | VC | 64.1 | — |
| Comparative Example 6 | 0 | acetone | MCEB + MEBB | — | 18.1 |
| | | | VC | — | 52.5 |
| Comparative | 3.0 | | MCEB + MEBB | — | 22.5 |
| Example 7 | | | VC | — | 62.5 |

The objects of the present invention cannot be attained when other solvent such as acetone, Sulfolane, (tetrahydrothiophene 1,1-dioxde) and the like is used instead of aliphatic alcohol. The effect of a solvent is shown by the following Comparative Examples.

COMPARATIVE EXAMPLES 4 - 7

Comparative Example 3 and Example 5 are repeated using acetone or Sulfolane instead of methanol. The results were shown in Table 3.

In case where the alkyl hydroxybenzoate is added to the reaction system, the concentration of alkali salt of alkyl hydroxybenzoate is sufficient for 10% by weight or more based on its aliphatic alcohol solution. As is apparent from the description above, the objects of the present invention are effectively attained by using highly concentrated alkali salt of alkyl hydroxybenzoate as well as adding alkyl hydroxybenzoate theretogether. Thus, the most desirable results are obtained when 20–80% by weight of alkali salt of alkyl hydroxybenzoate based on its aliphatic alcohol solution and 5% or more of alkyl hydroxybenzoate based on the amount of the alkali salt of alkyl hydroxybenzoate are employed together.

The thus obtained dialkyl (ethylenedioxy)bis-benzoate can easily be isolated by the conventional isolation method or by the combination of common unit processes.

The following Examples will serve further to illustrate the present invention.

EXAMPLE 7

In a sealed tube, 3.48 g (20 milimole) of sodium salt of methyl p-hydroxybenzoate, 0.99 g (10 milimole) of ethylene dichloride and 3.48 g of absolute ethanol were reacted at 180°C. The yields of the products with the lapse of time were shown in Table 4.

Table 4

| Products | Yield (%) Reaction time (min.) | | |
|---|---|---|---|
| | 6 | 15 | 40 |
| Vinyl chloride | 33.8 (3.88 milimole) | 36.9 | 36.5 |
| MCEB | 9.9 (0.99 milimole) | 0.0 | 0.0 |
| 4,4'-(ethylenedioxy)-bis-methylbenzoate | 37.4 (3.74 milimole) | 48.9 | 49.2 |

EXAMPLE 8

Example 7 was repeated, provided that 1.52 g. (10 milimole) of methyl p-hydroxybenzoate was added to the reaction system. The results were shown in Table 5.

Table 5

| Products | Yield (%) Reaction time (min.) | | |
|---|---|---|---|
| | 6 | 15 | 40 |
| Vinyl chloride | 22.4 | 25.0 | 26.2 |
| Ethylene dichloride | 7.4 | 1.7 | 1.0 |
| MEBB | 37.5 | 59.2 | 60.1 |

EXAMPLE 9

Into a coiled pipe reactor, 8 mm in diameter and 10 m in length, heated with Dowtherm at 182°C were introduced a uniformly mixed solution consisting of 195 parts by weight of sodium salt of methyl p-hydroxybenzoate, 66.5 parts by weight of ethylene dichloride, 42.6 parts by weight of methyl p-hydroxybenzoate and 316 parts by weight of absolute methanol with 12 minutes of contact time and reacted. The pressure in the reactor was held at 28 kg/cm² by adjusting with employing nitrogen gas. The reaction mixture leaving the reactor was cooled instantly and collected in a receiver. The reaction mixture was analyzed to obtain the following results:

| | |
|---|---|
| Sodium salt of methyl p-hydroxybenzoate | 11.9 % |
| Methyl p-hydroxybenzoate | 30.6 % |
| MEBB | 44.1 % |
| MCEB | 8.1 % |
| Phenol | 3.6 % |
| Mass balance | 98.3 % |
| Selectivity | 90.8 % |

What is claimed is:

1. A process for preparing a dialkyl (ethylenedioxy)-bis-benzoate comprising reacting an alkali salt of an alkyl hydroxybenzoate having one to eight carbon atoms in the alkyl group with ethylene dichloride in the presence of a saturated alcohol as a solvent, the improvement which comprises:
   a. the alkali salt of the $C_1$ to $C_8$ alkyl hydroxybenzoate being dissolved in a concentration of 18 to 80 percent in a saturated alcohol which is an alkanol having one to six atoms or cyclohexanol or a mixture thereof, and
   b. effecting the reaction at a temperature between 100° and 280° C. in the presence of 5 to 500 mole % of $C_1$ to $C_8$ alkyl hydroxybenzoate based on the amount of the alkali salt of said $C_1$ to $C_8$ alkyl hydroxybenzoate.

2. A process according to claim 1 wherein the alkali salt is a sodium salt of methyl hydroxybenzoate and the alkyl hydroxybenzoate is methyl hydroxybenzoate.

3. The process according to claim 1, wherein the concentration of the alkali salt of alkyl hydroxybenzoate is 20–80% by weight.

4. The process according to claim 1, wherein the alkali salt of alkyl hydroxybenzoate is para or meta isomer.

5. The process according to claim 1, wherein the alkali metal of the alkali salt of alkyl hydroxybenzoate is lithium, sodium or potassium.

6. The process according to claim 1, wherein the alcohol is methanol, ethanol, propanol, iso-propanol, butanol, amyalcohol, iso-amylalcohol, hexanol, or cyclohexanol or a mixture thereof.

7. The process of claim 1 wherein the reaction is carried out at a temperature between 120° and 230°C.

8. The process of claim 7 wherein the alcohol is ethanol.

* * * * *